July 28, 1964

C. H. PICOU 3,142,815

METHOD AND APPARATUS FOR ANALYSING AND PROCESSING SEISMIC
RECORDS EMPLOYING A WEIGHTING COEFFICIENT

Filed July 14, 1959

United States Patent Office 3,142,815
Patented July 28, 1964

3,142,815
METHOD AND APPARATUS FOR ANALYSING AND PROCESSING SEISMIC RECORDS EMPLOYING A WEIGHTING COEFFICIENT
Claude Henri Picou, Paris, France, assignor to Compagnie Générale de Géophysique, Paris, France, a corporation of France
Filed July 14, 1959, Ser. No. 827,057
Claims priority, application France Aug. 14, 1958
8 Claims. (Cl. 340—15.5)

This invention relates to seismic apparatus and methods.

My invention has for an object the provision of a method for geophysical prospecting by the use of seismic waves and it covers more particularly a method for analysis and exploitation of seismic records collected at ground level, with a view to cancellation of the parasitic signals which might conceal to a varying extent the main signal to be registered, or else, with a view to making such components or such components of the main signal which are of more particular interest appear more clearly.

According to my invention, this result is obtained by proceeding to a summation, under well-defined operative conditions as disclosed hereinafter, of the different records supplied by a common firing operation, whereby a unique record is obtained which shows the desired properties.

In the drawing:

FIG. 1 diagrammatically illustrates a linear array of seismometers;

I will first disclose my invention in its application to cancellation of parasitic signals.

It is a well-known fact that seismic prospecting is performed chiefly by first laying on the ground a number of aligned seismometers. Such seismometers are set for instance at the points 1, 2, . . . , 8, as illustrated in FIG. 1 of the accompanying drawings, said seismometers being uniformly spaced and separated from each other by equal distances L.

The number and the spacing of the seismometers depend on the method used, whether the seismic reflection method, or the seismic refraction method and they also depend on the depth of the layers or strata of which it is desired to define the location and the nature.

For instance, in the case of the seismic reflection method, the load of explosive material is comparatively small and it is preferably located in the vicinity of the middle point of the aligned seismometers, say at point 9. In contradistinction, in the case of application of the seismic refraction method which covers chiefly the examination of deep layers or strata, the charge is inserted at a considerable distance from the seismographs, preferably on the straight line joining the seismometers, for instance at point 10 of FIG. 1 and its importance is considerable.

Figure 1:
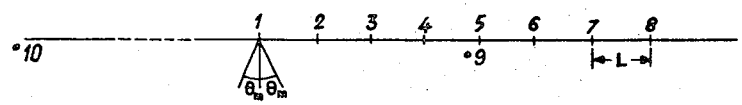

In FIG. 1, only eight locations are provided for the seismometers, but their number is larger in practice and may often risen up to 24 or even more; furthermore, each location such as 1, 2, etc. is provided in practice with not one, but two or more seismometers located comparatively near to each other, while their outputs are connected in series or in parallel, in order to obtain more reliable records.

Thus, after a normal firing, 24 records may, for example, be available; the latter are recorded nowadays preferably on magnetic tapes, each of said records producing a time curve function of the voltage collected by each group of seismometers.

It is a well-known fact that in practice such records are seriously disturbed by parasitic signals of all types which are added to the useful signals and it is of interest to cancel such parasitic signals as far as possible, since said signals make the interpretation of the record very difficult, while this interpretation is essential for obtaining useful data.

I have performed a thorough analysis of the different possible causes for such parasitic signals, which latter may arise, as well known, as a consequence of the parasitic signals produced by the amplifiers inserted between the seismometer and the recording means, or else, by the vibrations of the ground ascribable to the running of vehicles, to the passage of aircraft, to agricultural work in the fields, to the action of wind and even to the action of waves when operating near a coastline, or again, as a consequence of parasitic induction produced in the lines connecting the seismometers to the amplifiers and to the recording means by eddy currents of an industrial origin. However, the accumulation of these different disturbances accounts only for a small fraction of the totality of the parasitic signals collected.

Figure 2:
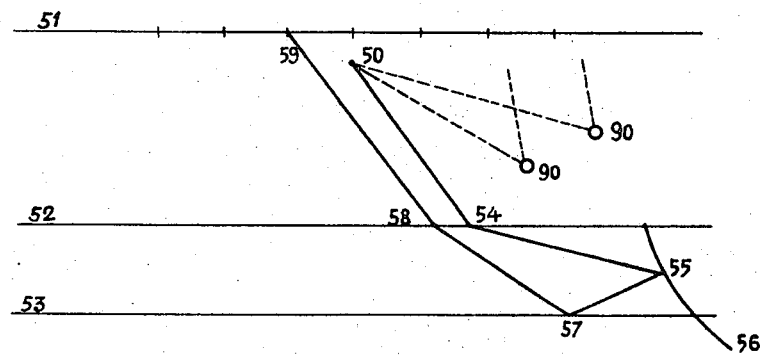
FIG. 2 illustrates a vertical section of ground to be explored with waves therein.

My investigations have led me to find that the major part of the parasitic signals is ascribable, as illustrated in FIG. 2, to the existence of parasitic reflections and reconances arising inside of the strata subjected to the seismic waves and produced in addition to the useful reflections produced by the inter-surface between two strata or ground structures of different natures; these parasitic reflections may be ascribed for instance to single blocks of rock material lying in the path of the waves and producing a great number of micro-seismic reflections the sum of which adds up to one fraction of the parasitic signals.

Generally speaking, the parasitic seismic waves are produced by compound phenomena such as reflections, refractions or diffractions of the incoming seismic wave produced by the explosion, as a consequence of the heterogeneous nature of the ground or geological structure, due for instance to the presence of rocky blocks, agglomerates and the like inclusions, or again, to breaks or cracks.

In a limestone formation for instance, it is even possible to consider as a first approximation that said formation acts after the manner of a wave guide and that inside the latter there appear parasitic reflections due to sudden changes in impedance. The resultant parasitic waves then return towards ground level with an angle of emergence which approximates the total reflection angle.

This is illustrated diagrammatically in FIG. 2 which is a vertical cross-section of the ground. 50 designates the buried charge of explosive, 51, the ground level, 52 and 53, the surfaces separating successive geological strata. The wave produced at 50 is subjected to a refraction at 54, when passing through the surface 52, after which it is reflected at 55 on a crack surface 56 and then again at 57 on the lower separating surface 53 and it is finally refracted at 58 before returning to the seismometers along the path 58–59.

It is apparent that the slope assumed by the returning path 58–59 is very near to that of the first section 50–54 of the path of the wave produced at 50.

In FIG. 2, 90 designates blocks of rocks producing parasitic reflections of the type disclosed hereinabove. If the geological structure is sufficiently compact, it may in fact provide a comparatively long travel for the seismic waves without any exaggerated attenuation thereof. The above analysis is obviously given by way of a theoretical diagram, since it is disclosed in terms of geometrical optics, while the existence of interferential effects is certain and such effects cannot be described in such simple terms; the essence of the conclusion remains however, according to the final wave emergence along an angle approximating the total reflection angle.

In contradistinction, the useful waves which are of interest for the geophysicists are those which are reflected normally on a strata-separating surface extending between two types of sediments and these waves have an angle of emergence which is much smaller than those of the parasitic waves which have just been described.

The invention contemplates positively cancelling the slanting parasitic components which are of no interest for the purpose considered and in removing them from the main echo obtained through a simple reflection.

Since the law of refraction may be written as follows:

$$\frac{\sin \theta_0}{C_0} = \frac{\sin \theta_1}{C_1} \cdots = \frac{\sin \theta_n}{C_n}$$

it is possible, in the case of flat horizontal geological strata, to compute the angle $\theta$ of emergence corresponding to a total reflection taking place on a layer at a known depth. Said angle is defined by the relationship:

$$\sin \theta_0 = \frac{C_0}{C_n}$$

$C_0$ and $C_n$ designating the velocities of the seismic waves in the surface stratum and in the deepest stratum respectively.

Assuming for instance $C_0 = 500$ m/s, $C_n = 5,000$ m/s, $\sin \theta_0 = 0.1$ and $\theta_0$ approximates 5°, it is necessary to try in such a case to cancel all the components, the emergence angle of which is equal to or higher than 5°. In this case, it is even preferable to cancel all the components, the slope of which is equal to or higher than $\theta_m = 3°$.

The above calculations are to be understood obviously as relating to a horizontal layer structure without any slanting of the layers. It would be an easy matter to take into account such a slanting.

Consequently, according to a first embodiment of my invention which is applied to the case of the reflection seismic method, my improved method for play-back of the records consists in resorting to means for cancelling the influence of signals reaching the seismometers under angles of emergence which are larger than $\theta_m$.

My mathematical investigations have led me to find that said results may be obtained without any modifications in the shape of the useful signal, which is essential for the valid interpretation of the compound record obtained. Furthermore, the modus operandi is such that the cancellation of parasitic waves does not depend on the slope of the separating surfaces producing useful signals which it is desired to register, provided however the angle of emergence of said signals remains smaller than $\theta_m$.

These mathematical investigations have allowed me to find that the approximation of the results is sufficient when constituted by the sum of the different records obtained through a same firing, provided there is ascribed to the component of the pulsation $w$ of each of said records a relative influence expressed by the following well-defined mathematical law:

$$f(n,w) = \frac{\sin nk}{nk_1}$$

$k$ and $k_1$ having the following values:

$$k = \frac{w \cdot L \sin \theta_m}{c} \qquad k_1 = \frac{w_1 \cdot L}{c} \sin \theta_m$$

In said formulae, $\theta_m$ is, as already mentioned, the maximum angle of the incoming signals which are allowed to reach the seismometers, $w(2\pi f)$, the pulsation of the corresponding component, $c$, the estimated speed of the seismic waves in the ground, $L$, the spacing between the successive seismometers, $n$, the numerical rank of the seismometer, starting from the center of the seismographic arrangement where the explosion takes place (the seismometers being uniformly spaced, as already mentioned) and, lastly, $w_1$, the lower limit of the recorded pulsations.

Experience shows that the value $\theta_m$ is experimentally ascertained with a sufficient accuracy, so as to allow a valid application of my invention. The same is the case for the different other data which are also ascertained experimentally, to wit: $w_1$ is the lowermost limit of the pulsations collected and $c$, the estimated speed of the seismic waves inside the ground in which the firing is performed.

In other words, my improved method consists chiefly in producing a ponderal or balanced summation both in space, which corresponds to ascribing to the position of each seismometer an importance corresponding to the numerical rank $n$ of its location in the row of seismometers and in the range of frequencies. The method applied in accordance with this last standpoint is similar to a harmonic analysis.

From a theoretical standpoint, it would be necessary to execute an infinite number of operations corresponding each to a discrete value of $w$ within the range of frequencies considered. However, in practice, very satisfactory results have been obtained by subdividing the range of useful frequencies of the record into a number of partial bands or sub-ranges which are sufficiently narrow for it to be possible to apply validly to each of them the summation method considered, assuming that in each sub-range the pulsation has a constant value equal to the pulsation of the median frequency of the sub-range.

Figure 3:
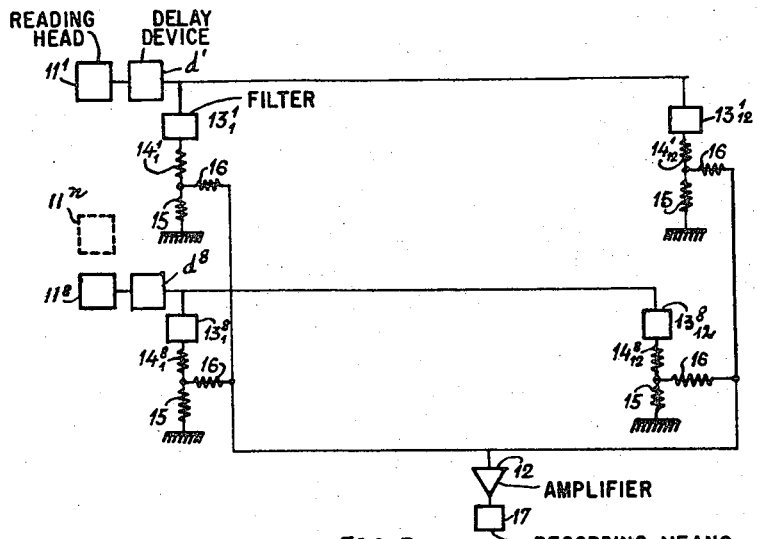
FIG. 3 is a schematic diagram of a circuit provided in accordance with one feature of the invention.

In FIG. 3 which illustrates diagrammatically an embodiment of the invention, it is assumed that there are eight records made and that the range of frequencies is subdivided into 12 narrow adjacent sub-ranges of equal widths.

The numbers of records and sub-ranges: 8 and 12 are, of course, given in an arbitrary manner and the invention is as well applicable whatever may be the values selected for them. Similarly, it is easy to imagine the modifications to provide for the case where the frequency ranges have unequal widths and the invention is also applicable in such cases.

The different records obtained at ground level as a consequence of a firing are treated as follows: said records are introduced into reading heads $11^1, \ldots, 11^8$ which thus produce voltages which vary with time and are identical with the voltages collected. The voltage applied by $11^1$ is applied simultaneously to the inputs of the filters $13_1^1, \ldots, 13_{12}^{12}$, the number of which is equal to the number of frequency sub-ranges into which is subdivided the range of useful frequencies which it is desired to explore.

Said filters are band-pass filters, which allow only a range of frequencies to pass, the width of which is precisely fixed, while arresting all other frequencies. Similarly, the voltage provided by $11^1$ is applied to the filters $13_1^2, \ldots, 13_{12}^2$ and so on . . . and the voltage provided by $11^8$ is supplied to the filters $13_1^8, \ldots, 13_{12}^8$. For sake of clarity, FIG. 3 shows only the extreme filters for the extreme reading apparatus.

It is apparent that the upper indicia serve for designating the ranks of the seismometers and the lower indicia, each of the elementary frequency ranges.

The output voltage for each of the $8 \times 12 = 96$ filters is applied separately to the terminal of a voltage divider constituted by two resistances in series, of which one, 14, has a value calculated for the filter considered, while the other, 15, has preferably the same value for all the filters. Thus, the output of the filter $13_1^1$ feeds the two resistances $14_1^1$ and 15, the output of the filter $13_{12}^1$ feeds the two resistances $14_{12}^1$ and 15 and, similarly, $13_1^8$ feeds $14_1^8$ and 15 and $13_{12}^8$ feeds $14_{12}^8$ and 15, and so on. The different resistances 15 being of equal values are designated by the same reference number in FIG. 3. Obviously, the resistances 14 have different values which are defined by the law $f(n,w)$ disclosed hereinabove.

In other words, the value of the resistance $14_b{}^a$ is defined in a manner such that the voltage at the point common to said resistance 14 and to the resistance 15 is equal to the output voltage of the filter multiplied by the value of $F(n_a, w_b)$, $w_b$ being the pulsation of the median frequency ($2\pi f$) of the band-pass of the filter considered and $n_a$, the numeric rank of the seismometer feeding said filter.

The sign + or − in the expression $F(n_a, w_b)$ is taken into account by suitably connecting the output terminal of the filter. The points connecting the different resistances 14 and 15 together are interconnected through resistances 16, so as to produce in a well-known manner the summation of the output voltages of the filters, the sum thus obtained being applied to the input end of an amplifier 12 feeding the recording means 17, which latter thus supplies the desired compound record containing only the useful signals excluding the signals feeding the seismometers at angles above $\theta_m$.

The diagrammatic wiring diagram illustrated in FIG. 3 shows two serious drawbacks, to wit: it requires a large number of filters and associated elements; for instance, in the most general case where twenty-four seismic paths are resorted to and where it is necessary to fractionate the range of useful frequencies for instance in twelve elementary ranges, it would be necessary to use $24 \times 12 = 288$ filters.

On the other hand, each of said filters produces separate individual phase shifts of the waves passing through it and said phase shifts would deform completely the compound record obtained and would even prevent it from having any practical interest.

According to a further feature of my invention, these two drawbacks are removed, on the one hand, by a suitable wiring arrangement which reduces the number of filters to a number equal to that of the sub-ranges into which the operative frequency range is subdivided and, on the other hand, by a modus operandi which cancels completely the individual phase shifts produced by the different filters used.

The reduction of the number of filters is obtained simply in that, since the phenomena resorted to are linear, it is possible to execute first a ponderal summation of the different records and to apply the voltage sums thus obtained to corresponding filters, while the voltages at the output of the filters are subjected to a further summation under uniform ponderal conditions, so as to obtain finally the single desired record.

On the other hand, and in order to cancel the individual phase shifts of the filters, the operation is executed in two stages according to a modus operandi well-known in the art:

In a first stage, the summation of the records is executed for each elementary range of frequencies, but the outputs of the different filters are not subjected to summation and, in contradistinction, there is performed an intermediate recording on a magnetic tape of the output voltage of each filter.

The second stage conissts in applying the voltage thus recorded to the input of each filter already used during the first stage, while, however, reversing the direction of unwinding of the magnetic tape, the output voltages of the different filters being then added, so as to obtain the single desired record.

It is immediately apparent that through the reversal of the direction of unwinding of the magnetic tape, the phase shifts introduced during the second passage of the voltage through each filter are equal, but opposite in sign to that produced during the first passage, so that the phase shifts are subjected to an accurate compensation in each of the filters. Consequently, the bulk of the apparatus to be used is considerably reduced and, on the other hand, the phase shifts due to the filters are completely cancelled.

Figure 4:
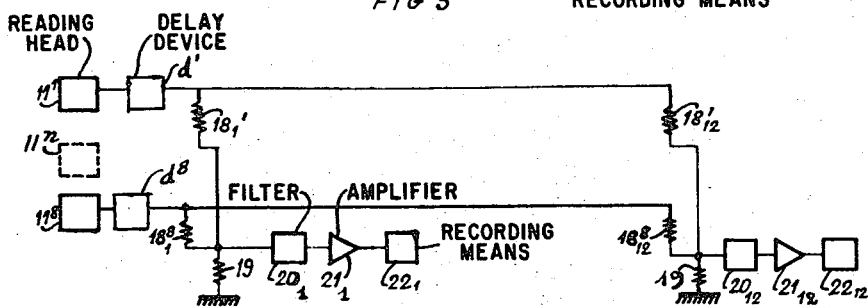
FIG. 4 illustrates a variation of the circuit of FIG. 3.

FIG. 4 is a wiring diagram showing the means for executing the first summation. The output ends of the reading heads $11^1, \ldots, 11^8$ of each record are connected, for the first sub-range of frequencies, with the resistances $18_1{}^1, \ldots, 18_1{}^8$, the opposite ends of which are interconnected and grounded through a single resistance 19. The voltage across the terminals of said resistance 19 is applied to a filter $20_1$ followed by an amplifier $21_1$ feeding the recording means $22_1$ which may be a magnetic recording head and the first channel of a magnetic tape which is moving in the forward direction.

This arrangement corresponds to the first sub-range of frequencies and a similar arrangement is provided for each sub-range, so that there are twelve arrangements of this type in the example selected, of which the last arrangement includes the resistances $18_{12}{}^1, \ldots, 18_{12}{}^8$, the outer ends of which are interconnected and grounded through a resistance, the value of which is preferably identical with that of the first arrangement and carries also the reference number 19. The voltage across the terminals of this latter resistance is fed to the filter $20_{12}$, which provides for the passage of the last sub-range of frequencies, the output of said filter feeding, through an amplifier $21_{12}$, the recording means $22_{12}$ which may be a magnetic recording head and a twelfth channel of a magnetic tape which is moving in a forward direction.

Obviously, the values of the resistances $13_b{}^a$ are calculated in a manner such as to obtain through a ponderal addition the application of the desired law $f(n,w)$, taking into account the fact that there is used in the present case only a resistance 19 while no resistance such as 15 is used for each sub-range of the wiring diagram of FIG. 2.

Each time the function $f(n,w)$ is negative, it is necessary to take this fact into account and to connect the corresponding resistance $18_b{}^a$ with a special output of the reading head $11^a$ connected in phase opposition with the normal output used when $f(n,w)$ is positive.

There are thus twelve records available, the number of which is thus equal to the number of sub-ranges of frequencies.

Figure 5:
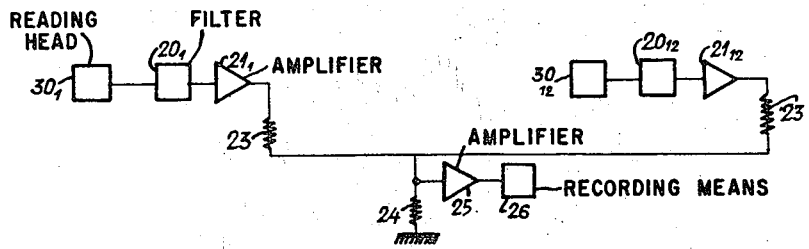
FIG. 5 is a schematic diagram illustrating a further feature of the invention.

The second summation is provided by using twelve reading heads $30_1, \ldots, 30_{12}$ (FIG. 5) which are opposite the appropriate channels of the magnetic tape which is part of elements $22_1$ to $22_{12}$ of FIG. 4, which read the records fed by the corresponding arrangement according to FIG. 4, but in an unwinding direction opposed to the direction of recording.

The voltages delivered by the reading heads $30_1, \ldots, 30_{12}$ are applied again to the inputs of the filters $20_1, \ldots, 20_{12}$ which have actually served for the recording in the first stage and the outputs of said filters are applied again to the same amplifiers $21_1, \ldots, 21_{12}$. Switching means may be used to connect the outputs of $30_1$ to $30_{12}$ respectively, to the inputs of $20_1$ to $20_{12}$ of FIGURE 4 or these elements may be duplicated.

The output voltage of the amplifiers are added together, which is readily obtained by connecting the output ends of said amplifiers through equal resistances 23 to one of the ends of a single resistance 24, the opposite end of which is grounded, while the voltage across the terminals of 24 is applied to an amplifier 25 controlling the recording means 26 producing the single desired final record.

It will be remarked that, as a consequence of the double passage of the record through the filters, the selection of the frequencies is improved, since the filters behave as filters having a double rejection figure as measured in decibels.

Obviously, the best results are obtained when the conventional static and dynamic corrections have been incorporated prior to executing the method according to my invention. These corrections include, on the one hand, the corrections which allow considering the record as being operated with seismometers arranged accurately along a horizontal straight line although in practice, and as a consequence of the outline of the ground level, this is not quite true and, on the other hand, the corrections required by the spherical shape of the seismic waves.

These corrections are quite conventional and it is unnecessary to describe them with any further detail, since they are outside the scope of the claims defining my invention.

The above-mentioned law $f(n,w)$, which leads to a cancelling of the signals entering the seismometers at an angle larger than $\theta_m$ is not the only possible law and I may in fact apply other mathematical laws.

For instance, instead of cancelling completely the signals, the angles of emergence of which are larger than $\theta_m$ while admitting entirely those having lower angles of emergence, it is sometimes of advantage to resort to a gradual transition, i.e., to resort to a law such that the curve of the signals recorded in accordance with their angles of emergence may be no longer a curve having a rectangular shape as hereinabove, but a curve having a different shape, say a Gauss curve.

Applicant's investigations have allowed him to find that this is possible for many applications. For instance by selecting the following law:

$$f(n,w) = \frac{wL}{2\pi C} e^{-\frac{\sigma}{2}\left(\frac{nwL}{c}\right)^2}$$

$\sigma$ being a parameter and $\pi$ and $e$ having their usual values ($\pi=3.14$ and $e=2.718$), it is possible to obtain with a sufficient approximation a physical law of a sensitivity decreasing with the angle of emergence, said law being of the type:

$$y = \frac{1}{\sqrt{2\pi\sigma}} e^{-\frac{\sin^2\theta}{2\sigma}}$$

When applying such laws, I am obviously limited by two predominant facts, to wit:

(a) The total length of the line of seismometers, which should theoretically have an indefinite length for the strict application of the above formula, is obviously limited in practice to a few hundred meters; however, applicant has found that this factor was not essential and that a seismometer line of a finite length is sufficient in practice;

(b) The distance L between two successive seismometer locations is always finite in practice, which has for its result the introduction of certain secondary lobes in the curves of sensitivity with reference to the angle of emergence, as shown by the directivity diagrams of the seismometer system, to which secondary lobes no reference has been made hitherto. In this case again, my investigations have proved that the secondary lobes are not objectionable if the distance L is kept underneath a limit value varying between 10 and 20 meters according to the area to be investigated.

Lastly, as already mentioned, the method and apparatus described may be applied successfully not only for cancelling the parasitic signals which are objectionable for the execution of the seismic reflection method, but also for differentiating the signals which are useful and of interest in the case of the seismic refraction method or, more accurately, for differentiating what the geophysicists term the "first arrival," the "second arrival," the "third arrival," etc.

Figure 6:
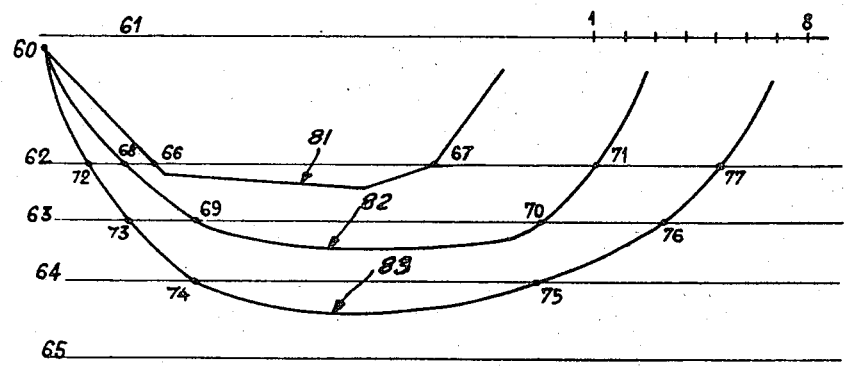
FIG. 6 is a further explanatory diagram.

This will now be explained, reference being made to FIG. 6 illustrating in vertical sectional view the ground examined in accordance with the seismic refraction method.

In FIG. 6, 60 designates the charge of explosive located near the surface of the ground shown by the line 61.

The uniformly aligned seismometers are shown at 1, . . ., 8. 62, 63, 64 and 65 designate the horizontal surfaces separating strata of different natures.

A wave generated from point 60 and subjected to refraction so as to remain localized in the earth layers comprised between the surfaces 62 and 63 is shown as following the path 60–66–67 which I shall term briefly hereinafter the path 81, while a more inclined wave penetrates the earth formation extending between surfaces 63 and 64 and follows the path 82 through the points 68, 69, 70 and 71.

Lastly, a wave which is still nearer verticality follows a path 83 passing through the points 72, 73, 74, 75, 76 and 77.

The charge 60 is located at a point which is remote from the seismometer line defined by the alined seisometers 1, . . ., 8. It is a well-known fact that the apparent speed of horizontal propagation through earth of the waves such as those following the path 81 is equal to the speed of propagation of the seismic disturbances in the second stratum between 62 and 63 and, similarly, the speeds of apparent horizontal propagation through the earth along paths 82 and 83 are equal respectively to the speeds of the seismic waves in the third stratum between 63 and 64 and in the fourth stratum between the surfaces 64 and 65.

Normally, only the first arrivals may be readily investigated, taking into account the natural fact that the deepest strata are the most compact and, consequently, those wherein the speed of seismic propagation is the largest. In order to examine for instance the waves refracted inside the fourth stratum, a firing distance, i.e., a distance between the charge 60 and the alined seismometers 1, . . ., 8, is selected, which is large enough for the waves along path 83 to arrive before the waves along path 82, said distance being yet sufficiently short for said waves following the path 83 to arrive also before the waves refracted in still lower or underlying strata such as those lying under the surface 65 and in which the speed of propagation is highest.

This selection often leads to the adoption of a very large firing distance, of the order of 30 to 40 km. and, consequently, to the necessity of resorting to very high explosive charges in order to generate a seismic wave strong enough to be detectable.

Through the application of my invention to the seismic refraction method, it is possible to get rid of this limitation and to reduce the distance between the explosive charge and the seismometers and thereby to reduce the size of said charge and, finally, the difficulty and price of the firing operation.

As a matter of fact, the analysis of the record is predicated on the fact that when it is desired to examine and follow the waves on the path 83 for instance, which waves are refracted inside the fourth stratum, said waves are recognizable and distinguish themselves from the other waves through their apparent horizontal speed which is equal to the speed of propagation of the seismic waves in said fourth stratum.

I will now disclose how it is possible to cut out the other waves such as those following the paths 81 and 82, so as to leave in the final record only the waves following the path 83 passing through the fourth stratum.

I begin by delaying in bulk the seismic record obtained at 1, with reference to that executed at 2, the time lag being equal to $$t = \frac{L}{Vd}$$

L being the distance between the two seismometer locations 1 and 2, while $Vd$ is the speed of seismic propagation in the stratum to be examined.

This being done, the two further records thus obtained 1' (obtained through delaying record 1) and 2 are subjected to a further delay by a time lag $t$ with reference to the record obtained at 3 and so on, and this in order to transform finally the records executed at 1, 2, 3, 4, . . ., 8 into as many theoretically synchronous records, since they are time-corrected according to the apparent speed of horizontal propogation V$d$. Accordingly, delay means $d^1$, . . ., $d^8$ are introduced after the associated reading heads $11^1$, . . ., $11^8$. The amount of delay provided is determined by the position of the associated seismometer along the line in accordance with the above cited formula, i.e., $$t = \frac{L}{Vd}$$

These records, time-corrected according to V$d$, are then subjected to the action of the apparatus disclosed hereinabove in the manner described. As a matter of fact, and according to the invention, the waves which do not progress with a speed of apparent propogation in earth equal to or approximating V$d$ are cancelled and this is the case for the waves following the paths 81 and 82, while the waves having an apparent horizontal speed V$d$ will remain in the record.

What I claim is:

1. In combination with a line of seismometers adapted for receiving seismic waves generated by an explosion at a position aligned with said line of seismometers: a plurality of record means each of said record means operatively coupled to a respective seismometer for recording the waves received by the particular seismometer, a plurality of first means connected to each record means for selecting given frequency ranges of waves and for reducing the amplitude of waves received from each reading head in accordance with a ponderal coefficient related to the value of the mean pulsation of the frequency range and the location of each seismometer, and second means connected to each of said plurality of first means for adding the plurality of frequency selected and amplitude reduced waves, and third means for amplifying and recording the waves obtained by said second means.

2. In combination with a line of seismometers adapted for receiving seismic waves generated by an explosion at a position aligned with said line of seismometers: a plurality of record means, each of said recording means operatively coupled to a respective seismometer for recording the waves received by the particular seismometer, a plurality of delay means connected respectively to said record means for delaying the waves recorded by the record means in accordance with the position of the associated seismometer, a plurality of first means connected respectively to said delay means for selecting a given frequency ranges of waves and for reducing the amplitude of waves received from each delay means in accordance with a ponderal coefficient related to the value of the mean pulsation of the frequency range and the location of each seismometer, and second means connected to each of said plurality of first means for adding the plurality of frequency selected and amplitude reduced waves, and third means for amplifying and recording the waves obtained by said second means.

3. In combination with a line of seismometers adapted for receiving seismic waves generated by an explosion at a position aligned with said line of seismometers: a plurality of record means, each of said record means operatively coupled to a respective seismometer for recording the waves received by the particular seismometer, a group of $n$ filter means respectively connected to said record means for selecting $n$ given frequency ranges of waves, $n$ groups of attenuating means wherein each group of attenuating means includes an attenuating means coupled to one of said filter means, each of said attenuating means having an attenuation factor related to the mean frequency of the associated filter means and the location of the associated seismometer and means connected to each of said attenuating means for adding the waves received therefrom, and third means for amplifying and recording the waves obtained by said second means.

4. In combination with a line of seismometers adapted for receiving seismic waves generated by an explosion at a position aligned with said line of seismometers; there being $m$ seismometers in said line of seismometers, $m$ record means respectively coupled to said seismometers for recording the waves received by the seismometers, wherein the inputs of said $n$ filter means of each group are connected in parallel to one of the $m$ record means for selecting $n$ given frequency ranges of the waves recorded by the associated recorded means, $n$ groups of $m$ amplitude changing means each having an input and an output wherein the inputs of the $m$ amplitude changing means respectively in each group of the $n$ groups of amplitude changing means are connected to the outputs of $m$ filter means, one from each of the $n$ groups of filtering means, respectively, all of the amplitude changing means changing the amplitudes of received waves in accordance with a ponderal coefficient related to the value of the mean frequency of the frequency range of the filter means it is connected to and the location of the seismometer related to the record means to which the input of said filter is connected to, $n$ means for connecting the outputs of the $m$ amplitude changing means of each group together to form $n$ combined waveforms, and means for combining and amplifying the $n$ combined waveforms.

5. In combination with a line of seismometers adapted for receiving seismic waves generated by an explosion at a position aligned with said line of seismometers, there being $m$ seismometers in said line of seismometers, $m$ record means respectively coupled to said seismometers for recording the waves received by the seismometers, wherein the inputs of said $n$ filter means of each group are connected in parallel to one of the $m$ reading means for selecting $n$ given frequency ranges of the waves recorded by the associated record means, $n$ groups of $m$ attenuating means each having an input and an output wherein the inputs of the $m$ attenuating means respectively in each groups of the $n$ groups of attenuating means are connected to the outputs of $m$ filtering means, one from each of the $n$ groups of filtering means, respectively, all of said attenuating means changing the amplitudes of waves in accordance with a ponderal coefficient related to the value of the mean frequency of the frequency range of the filter means to which it is connected and the location of the seismometer related to the record means to which the input of said filter is connected to, $n$ means for connecting the outputs of the $m$ attenuating means of each group together to form $n$ combined waveforms, and means for combining and amplifying the $n$ combined waveforms.

6. Apparatus for processing seismic data in the form of waves relative to geological strata received by a line of $m$ seismometers upon the explosion of a charge at a given point aligned with said $m$ seismometers, said apparatus comprising $m$ record means, each of said record means being related to one of said seismometers for recording waves received by said seismometers, $m$ delay means having inputs respectively connected to said $m$ record means and outputs, $m$ groups of $n$ filter means each having an input and an output wherein the inputs of said $n$ filter means of each group are connected in parallel to the output of one of the $m$ delay means for selecting $n$ given frequency ranges of the waves received by the associated record means, $n$ groups of $m$ attenuating means each having an input and an output wherein the inputs of the $m$ attenuating means respectively in each group of the $n$ groups of attenuating means are connected to the outputs of $m$ filter means, one from each of the $m$ groups of filter means, respectively, all of the attenuating means attenuating the amplitude of received waves in accordance with a ponderal coefficient related to the value of the mean frequency of the frequency range of the filter means it is connected to and the location of the seismometer related to the record means to which the input of said filter means is associated, $n$ means for connecting the outputs of the $m$ attenuating means of each group together to form $n$ combined waveforms, and means for combining and amplifying the $n$ combined waveforms.

7. In a method of obtaining seismic data involving the firing of an explosive charge in a geological mass and receiving with an alignment of seismometers the resulting waves emerging from said mass, the method of eliminating the waves having an angle of emergence which is greater than a predetermined critical angle comprising the steps of dividing the waves received by the respective seismometers into their spectral components, modifying each component according to the relative position of the associated seismometer, speed of the associated wave, frequency of the component, magnitude of said critical angle and spacing between said seismometers, and recombining the components thereby eliminating undesired side effects.

8. A method as claimed in claim 7 wherein said angle is 3 degrees.

References Cited in the file of this patent

UNITED STATES PATENTS

| | | |
|---|---|---|
| 2,351,456 | Ricker | June 13, 1944 |
| 2,558,868 | McCarty | July 3, 1951 |
| 2,578,133 | Hawkins | Dec. 11, 1951 |
| 2,620,890 | Lee et al. | Dec. 9, 1952 |
| 2,698,927 | Parr | Jan. 4, 1955 |
| 2,757,357 | Peterson | July 31, 1956 |
| 2,794,966 | McCarty | June 4, 1957 |
| 2,843,676 | Halliday | July 15, 1958 |
| 2,851,122 | McCullum | Sept. 9, 1958 |
| 2,864,072 | Blake | Dec. 9, 1958 |